S. B. GLEASON.
ARTIFICIAL FISH BAIT.
APPLICATION FILED JAN. 12, 1920.
1,385,536.
Patented July 26, 1921.
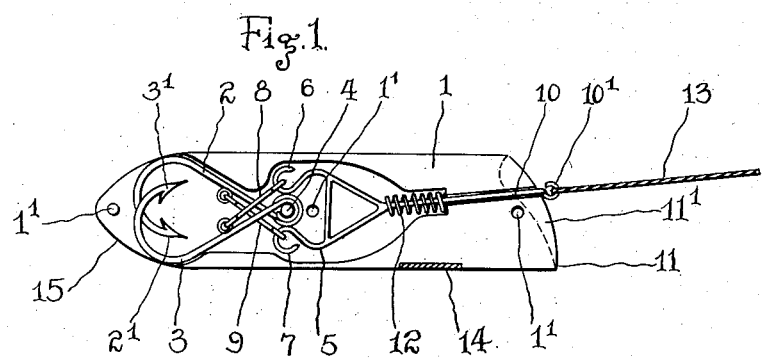
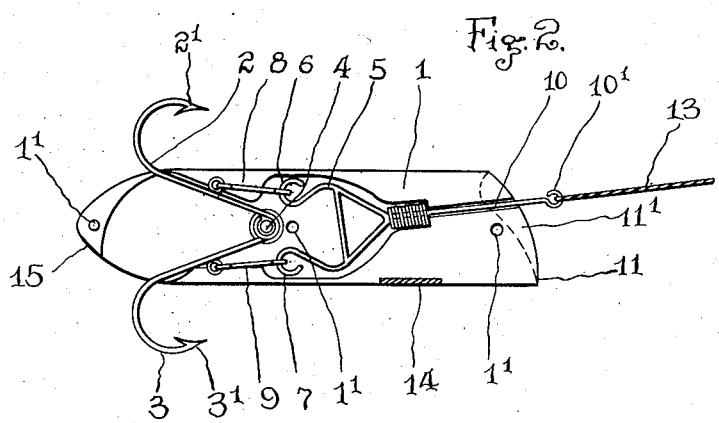
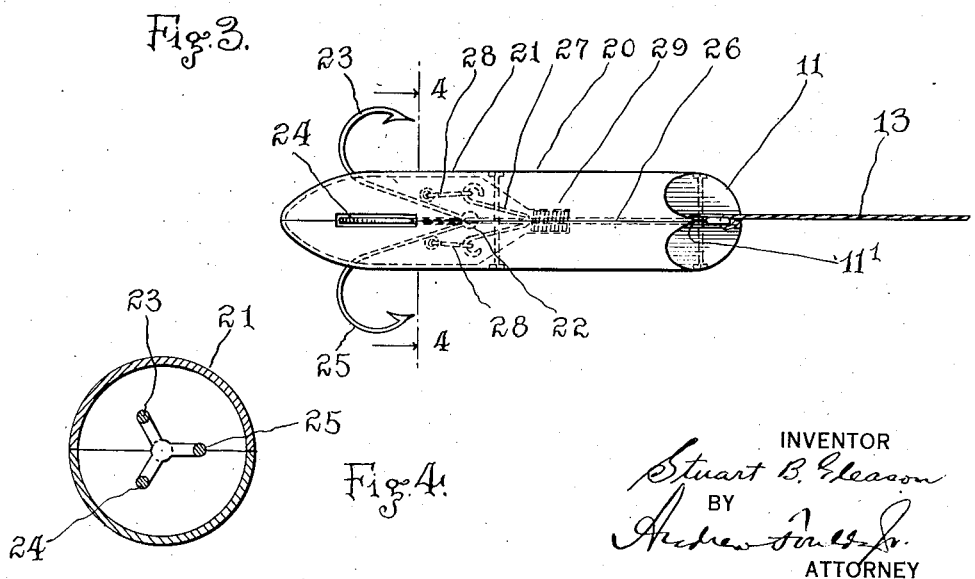
INVENTOR
Stuart B. Gleason
BY
ATTORNEY

UNITED STATES PATENT OFFICE.

STUART B. GLEASON, OF PASSAIC, NEW JERSEY.

ARTIFICIAL FISH-BAIT.

1,385,536.     Specification of Letters Patent.     Patented July 26, 1921.

Application filed January 12, 1920. Serial No. 350,738.

*To all whom it may concern:*

Be it known that I, STUART B. GLEASON, a citizen of the United States, and resident of the city of Passaic, in the county of Passaic and State of New Jersey, have invented certain new and useful Artificial Fish-Bait, of which the following is a specification.

My invention relates to improvements in artificial bait for fish and the like and the object of my invention is to provide a novel, simple and convenient bait for catching fish.

I accomplish this object by the device illustrated in the accompanying drawings in which—

Figure 1 is a view of the device closed, with one side or cover removed.

Fig. 2 is a view of the same open,

Fig. 3 is a view of an optional form of the device showing an optional arrangement of the hooks, and Fig. 4 is a section on the line 4—4 in Fig. 3.

Similar characters refer to similar parts throughout the several views.

My improved bait comprises a body 1 of wood or other like material preferably of a lighter specific gravity than water to the end that the same will float at or near the surface and having a plurality of hooks 2, 3 normally concealed within the body and adapted to be projected beyond the body when the movement of the device through the water is retarded and a pull exerted upon the lead 10. The hooks 2, 3 are provided with the common and usual form of barbed ends 2' and 3' respectively and are pivotally mounted on a pivot 4 set at the approximate axial center of the device but preferably toward the rear end. Forward of the said pivot 4, I provide a yoke 5 having arms 6 and 7 which engage links 8 and 9 carried by the hooks 2 and 3 respectively. The yoke 5 is connected with the lead 10 in any suitable manner and intermediate the nose 11 of the device and the yoke 5, I provide a spring 12 adapted to normally hold the yoke 5 in a position toward the hooks 2 and 3 to retain the hooks within the body of the device. At the end 10' of the lead 10 I provide a ring or loop to be attached to the fish line 13.

I preferably provide within the device, at the lower side thereof a weight 14 to keep the device in an upright position in the water and prevent rolling.

I prefer to construct the body in a substantially cylindrical form somewhat flattened at the sides and having a blunt rear point or stern 15 and a concave-convex prow or nose 11 with a rib 11' vertically arranged thereon and having a base projecting beyond the upper part thereof for the purpose of giving a movement in the water, when drawn by the fish line, somewhat approximating the movement of a bait fish.

I preferably split the device longitudinally and construct the same of two counterpart side sections bound together by bolts or pins inserted through the bolt apertures or sockets 1', 1', 1'. I find this arrangement preferable to that of a solid body for the reason that ready access to the interior is thus attained.

An optional form of the device is illustrated in Figs. 3 and 4 in which I provide three hooks instead of the two hooks used in the preferred form of my device illustrated in Figs. 1 and 2; the general contour of both forms of the device is the same. In this optional form of the device however, I use a shell 21 for the stern section of the body 20 and provide therein a pivot 22 on which are mounted three hooks 23, 24 and 25 adapted to be projected beyond the surface of the body through their respective apertures.

On the lead 26 I provide a tripod 27 having its three legs connected with the three hooks 23, 24 and 25 by means of links 28 as above described and the hooks are normally retained within the body by the coiled spring 29.

My device being thus assembled, the bait is drawn through the water by means of the line 13 and is designed to attract fish by its movement. When the fish strikes and closes upon the bait, thus retarding the movement of the device, the concealed hooks will be projected by the pull of the line 13 and will catch in the mouth of the fish which will be securely impaled thereon.

Having thus described my invention, what I claim is:

In a device of the character described, a body, a hook normally concealed and pivotally hung therein, a yoke, a connecting link between the yoke and a point intermediate the ends of the hook and a lead attached to the yoke whereby the hooks may be projected beyond the surface of the body, substantially as shown and described.

Signed at the city of Passaic, in the county of Passaic and State of New Jersey this 30th day of December, A. D. 1919.

STUART B. GLEASON.